(12) United States Patent
Bauer et al.

(10) Patent No.: US 8,999,879 B2
(45) Date of Patent: Apr. 7, 2015

(54) HYDROCARBON CONVERSION SYSTEM, AND A PROCESS AND CATALYST COMPOSITION RELATING THERETO

(71) Applicant: UOP LLC, Schaumburg, IL (US)

(72) Inventors: Lorenz J. Bauer, Schaumburg, IL (US); James F. McGehee, Houston, TX (US)

(73) Assignee: UOP LLC, Des Plaines, IL (US)

(*) Notice: Subject to any disclaimer, the term of this patent is extended or adjusted under 35 U.S.C. 154(b) by 38 days.

(21) Appl. No.: 13/762,419

(22) Filed: Feb. 8, 2013

(65) Prior Publication Data

US 2013/0149213 A1 Jun. 13, 2013

Related U.S. Application Data

(62) Division of application No. 12/412,738, filed on Mar. 27, 2009, now Pat. No. 8,372,773.

(51) Int. Cl.
| | |
|---|---|
| *B01J 23/00* | (2006.01) |
| *B01J 31/28* | (2006.01) |
| *B01J 23/745* | (2006.01) |
| *B01J 35/02* | (2006.01) |
| *B01J 37/00* | (2006.01) |
| *B01J 37/02* | (2006.01) |
| *C10G 49/02* | (2006.01) |

(52) U.S. Cl.
CPC ............... *B01J 31/28* (2013.01); *B01J 23/745* (2013.01); *B01J 35/023* (2013.01); *B01J 37/0036* (2013.01); *B01J 37/0219* (2013.01); *C10G 49/02* (2013.01)

(58) Field of Classification Search
USPC .......................... 502/159, 221, 151, 217, 171
See application file for complete search history.

(56) References Cited

U.S. PATENT DOCUMENTS

| | | | | |
|---|---|---|---|---|
| 3,051,673 | A * | 8/1962 | Stark | 524/350 |
| 4,923,838 | A * | 5/1990 | Khulbe et al. | 502/151 |
| 4,999,328 | A * | 3/1991 | Jain et al. | 502/151 |
| 5,070,064 | A * | 12/1991 | Hsu et al. | 502/325 |
| 6,294,498 | B1 * | 9/2001 | Darcissac et al. | 502/159 |
| 7,754,635 | B2 * | 7/2010 | McKenna | 502/22 |
| 8,614,158 | B2 * | 12/2013 | Leviness | 502/20 |
| 2005/0182145 | A1 * | 8/2005 | Mohedas et al. | 518/716 |

FOREIGN PATENT DOCUMENTS

WO WO 2007099365 A1 * 9/2007

* cited by examiner

*Primary Examiner* — Melvin C Mayes
*Assistant Examiner* — Stefanie Cohen

(57) ABSTRACT

One exemplary embodiment can be a process for making a catalyst including an effective amount of iron for catalyzing one or more reactions in a hydrocarbon conversion system. The process can include grinding and coating the particles. The ground particles can have an effective amount of iron, and substantially all the particles may have a maximum dimension no larger than about 130 microns. The coating can have an effective amount of one or more hydrocarbons to provide the catalyst with improved flowability.

18 Claims, 1 Drawing Sheet

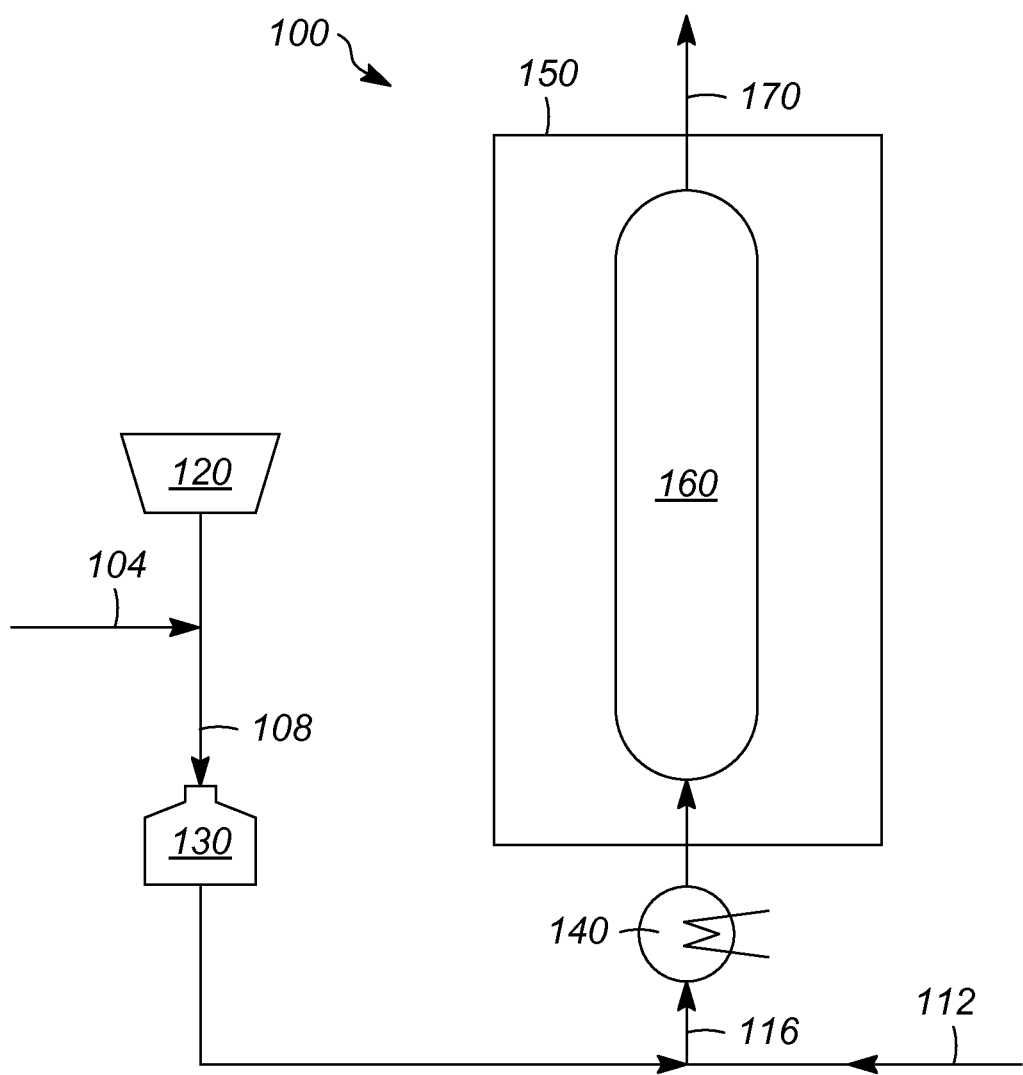

US 8,999,879 B2

HYDROCARBON CONVERSION SYSTEM, AND A PROCESS AND CATALYST COMPOSITION RELATING THERETO

CROSS-REFERENCE TO RELATED APPLICATION

This application is a Division of application Ser. No. 12/412,738 filed Mar. 27, 2009, now U.S. Pat. No. 8,372,773, the contents of which are hereby incorporated by reference in its entirety.

FIELD OF THE INVENTION

This invention generally relates to a hydrocarbon conversion system, and more particularly to at least one of a process, a catalyst composition, and/or a slurry catalyst system relating thereto.

DESCRIPTION OF THE RELATED ART

Catalysts are often used in hydroconversion processes. In the hydroconversion of heavy oils, biofuels, and coal liquids, typically a catalytic slurry system is utilized. In such systems, often large amounts of catalyst are utilized.

Typically, these catalysts are relatively inexpensive and do not contain valuable metals, such as noble group VIII metals. Often, such catalysts have a uniform, small particle size. Unfortunately, catalyst, such as iron sulfate, can meet the desired economic costs, but may also be hydrophilic. As such, the catalytic material may absorb moisture and clump. Generally, the clumping of the catalyst creates problems when attempting to disperse the catalyst into the hydrocarbon feed. Usually, the catalyst is dispersed into a hydrocarbon feed to form a slurry before the combined material enters a reactor. Thus, a catalyst material with a high degree of flowability is desirable. Typically, a catalyst that can be relatively hydrophobic and clumping resistant would have the requisite flowability.

SUMMARY OF THE INVENTION

One exemplary embodiment can be a process for making a catalyst including an effective amount of iron for catalyzing one or more reactions in a hydrocarbon conversion system. The process can include grinding and coating the particles. The ground particles can have an effective amount of iron, and substantially all the particles may have a maximum dimension no larger than about 130 microns. The coating can have an effective amount of one or more hydrocarbons to provide the catalyst with improved flowability.

Another exemplary embodiment may be a slurry catalyst composition. The slurry catalyst composition can have a catalytically effective amount of one or more compounds including iron, and a coating including one or more hydrocarbons having a melting point temperature of no more than about 250° C.

Yet a further exemplary embodiment can be a slurry catalyst system. The slurry catalyst system may include an upflow tubular reactor. Generally, the upflow tubular reactor can receive a hydrocarbon feed and a slurry catalyst composition. The hydrocarbon feed can include one or more compounds having an initial boiling point temperature of at least about 340° C. The slurry catalyst composition may include a catalytically effective amount of one or more compounds, and a coating having a hydrocarbon with a melting point temperature of no more than about 250° C. for improving flowability of the slurry catalyst composition.

The embodiments disclosed herein can provide a slurry catalyst material that can be hydrophobic and resist clumping. As a result, the material can be easily handled and combined with a hydrocarbon feed to form a slurry before entering a hydroconversion reactor. The advantageous properties allow the use of a relatively inexpensive material that can be easily handled to facilitate forming a slurry for conducting hydroprocessing reactions.

DEFINITIONS

As used herein, the term "stream" can be a stream including various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated $C_1$, $C_2$, $C_3$ ... $C_n$ where "n" represents the number of carbon atoms in the one or more hydrocarbon molecules.

As used herein, the term "zone" can refer to an area including one or more equipment items and/or one or more sub-zones. Equipment items can include one or more reactors or reactor vessels, heaters, exchangers, pipes, pumps, compressors, and controllers. Additionally, an equipment item, such as a reactor, dryer, or vessel, can further include one or more zones or sub-zones.

As used herein, the term "substantially" can mean an amount of generally at least about 80%, preferably about 90%, and optimally about 99%, by weight, of a compound, class of compounds, or catalyst.

BRIEF DESCRIPTION OF THE DRAWING

The FIGURE is a schematic depiction of an exemplary hydrocarbon conversion system.

DETAILED DESCRIPTION

Referring to the FIGURE, one exemplary hydrocarbon conversion system 100 can be a slurry reaction or bubble column system including a reservoir 120, a holding tank 130, a heater 140, and a hydroprocessing reaction zone 150. Exemplary systems are disclosed in, e.g., U.S. Pat. No. 5,755,955 and U.S. Pat. No. 5,474,977.

Typically, a hydrocarbon feed 104 can be provided, which may be a heavy oil vacuum bottom, a vacuum residue, a fluid catalytic cracking slurry oil or other heavy hydrocarbon-derived oils. Alternatively, the hydrocarbon feed 104 can be at least one of coal liquid or a biofuel feedstock such as lignin, one or more plant parts, one or more fruits, one or more vegetables, a plant processing waste, one or more woodchips, chaff, one or more grains, one or more grasses, a corn, one or more corn husks, one or more weeds, one or more aquatic plants, hay, paper, and any cellulose-containing biological material.

A reservoir 120 can provide a catalyst to be combined with the hydrocarbon feed 104. A resultant slurry 108, i.e., a combination of the catalyst and the hydrocarbon feed 104 having a solids content of about 0.01 to about 10%, by weight, can pass to a holding tank 130 before being combined with a gas 112.

The gas 112 typically contains hydrogen, which can be once-through hydrogen optionally with no significant amount of recycled gases. Alternatively, the gas 112 can contain recycled hydrogen gas optionally with added hydrogen as the hydrogen is consumed during the one or more hydroprocessing reactions. The gas 112 may be essentially pure hydrogen or may include additives such as hydrogen sulfide or light hydrocarbons, e.g., methane and ethane. Reactive or non-reactive gases may be combined with the hydrogen introduced into the hydroprocessing reaction zone 150 at the desired pressure to achieve the desired product yields.

A combined feed 116 including the slurry 108 and the gas 112 can enter the heater 140. Typically, the heater 140 is a heat exchanger using any suitable fluid such as the hydroprocessing reaction zone 150 effluent or high pressure steam to provide the requisite heating requirement. Afterwards, the heated combined feed 116 can enter the hydroprocessing reaction zone 150 including an upload tubular reactor 160. Often, slurry hydroprocessing is carried out using reactor conditions sufficient to crack at least a portion of the hydrocarbon feed 104 to lower boiling products, such as one or more distillate hydrocarbons, naphtha, and/or C1 to C4 products. Conditions in the hydroprocessing reaction zone 150 can include a temperature of about 340° to about 600° C., a hydrogen partial pressure of about 3.5 to about 10.5 MPa and a space velocity of about 0.1 to about 30 volumes of hydrocarbon feed 104 per hour per reactor or reaction zone volume. A reaction product 170 can exit the hydroprocessing reaction zone 150.

Generally, the catalyst for the hydrocarbon conversion system 100 provides a composition that is hydrophobic and resists clumping. Consequently, it may be suitable and easily combined with the hydrocarbon feed 104. Typically, the slurry catalyst composition can include a catalytically effective amount of one or more compounds having iron. Particularly, the one or more compounds can include at least one of an iron oxide, an iron sulfate, and an iron carbonate. Other forms of iron can include at least one of an iron sulfide, a pyrrhotite, and a pyrite. What is more, the catalyst can contain materials other than an iron, such as at least one of molybdenum, nickel, and manganese, and/or a salt, an oxide, and/or a mineral thereof.

Preferably, the one or more compounds includes an iron sulfate, and more preferably at least one of an iron sulfate monohydrate and an iron sulfate heptahydrate. Oxidic iron-containing compounds obtained from sources such as a limonite, a laterite, a wrought iron, a clay, a magnetite, a hematite, a gibbsite, or a Kisch iron can also be used. One particularly desired material is ferrous sulfate. The ferrous sulfate can either be a monohydrate or a heptahydrate. The monohydrate can contain up to about 15%, by weight, water while the heptahydrate can contain up to about 51%, by weight, water. The grain size of the particles can have a largest dimension greater than about 0.2 millimeter (hereinafter may be abbreviated "mm") but smaller than about 4.3 mm as determined by about 95% of the particles. In addition, the bulk density can range from about 880 to about 1,200 kg per meter-cubed.

The ferrous sulfate can contain less than 1%, by weight, of one or more of the following, namely arsenic, cadmium, chromium, copper, lead, magnesium, manganese, nickel, and/or zinc. The ferrous sulfate can be obtained from any suitable source, such as QC Corporation of Baltimore, Md.

Typically, the catalyst particle coating can reduce the hydrophilic properties of the particles. The catalyst can include a coating of a hydrocarbon having an initial boiling point temperature of at least about 250° C., or about 340° C., and/or a melting point temperature of no more than about 250° C., or no more than about 80° C. In addition, the coating can include one or more hydrocarbons compatible with the feed for processing in a hydrocarbon conversion system, such as a fluid catalytic cracking slurry system. In addition, the coating can have sufficient moisture resistance to prevent agglomeration of the pelletized catalyst particles. Typically, the coating can include at least one of a wax, a pitch, a deasphalted oil, a petroleum resin, and a low molecular weight polymer.

Preferably, the coating can include a pitch having a melting point no more than about 250° C., preferably no more than about 225° C., or a paraffin wax having a melting point of no more than about 80° C., preferably no more than about 60° C.

Preparing an exemplary catalyst can include providing a weight ratio of catalyst to hydrocarbon coating of about 200:1 to about 1:1, optimally about 2:1. As an example, the catalyst coating can be about 0.5 to about 50%, by weight, of the total catalyst composition. A catalyst such as ferrous sulfate may contain water, which can include lattice bond water of hydration and/or physically absorbed water. A loss on ignition adjustment can be used to calculate the amount of catalyst to be combined with the hydrocarbon coating. The loss on adjustment may be made by measuring a weight loss on heating to about 600° C., and comparing the results with the theoretical value calculated based on the molecular formula to obtain an adjusted molecular weight for use in calculating the amounts to blend in the formulations.

The hydrocarbon coating, such as a pitch or a paraffin wax, can be combined with the catalyst, such as iron sulfate, e.g., iron sulfate monohydrate, in a continuous high speed mixer/heat exchanger. Optionally, a small amount of water, such as less than about 1%, by weight, based on the weight of the catalyst particles, can be added to aid in agglomerating the particles. The rotary shaft of the mixer can be equipped with paddles, which may atomize the mixture and convey it through the reaction chamber of the machine. The jacketed barrel and the rotary shaft may be heated by steam or an oil-based heating medium above the melting temperature of the hydrocarbon coating, such as about 50° C. above the melting point of the hydrocarbon coating. The hydrocarbon coating may be picked-up by the melted matrix as it is atomized by the rotation of the rotary shaft, which typically rotates at about 3,000 to about 4,000 revolutions per minute (hereinafter may be abbreviated "rpm"). Generally, a residence time is about 10 to about 20 seconds when the temperature of the jacket and the rotary shaft are above the melting point of the hydrocarbon coating. An exemplary mixer is sold under the trade designation TURBULIZER® made by Hosokawa Bepex Corporation of Minneapolis, Minn.

After leaving the mixer, the mixture can be cooled below the melting point of the coating. The produced catalyst particles can have a maximum dimension of about 50 to about 5,000 microns, preferably about 50 to 500 microns, more preferably less than about 130 microns, and optimally less than about 90 microns. The catalyst particles may be agglomerated into larger spheres of about 1 centimeter in diameter that can easily be handled. The ferrous sulfate can be pelletized by using other methods, such as those methods disclosed in, e.g., U.S. Pat. No. 5,108,481.

Desirably, the dispersability of the catalyst in the hydrocarbon by using the hydrocarbon coating may prevent agglomeration when storing and handling the catalyst, and thus aides mixing and dispersing into a hydrocarbon feed. As an example, the catalyst can contain a core of monohydrate or moist heptahydrate with a coating of pitch. The catalyst can have a consistent iron concentration delivered to a hydroconversion system in a dry, hydrophobic, and free-flowing large particles. Thus, the catalyst can be easily crumbled and dissolved in a hot feed with, e.g., a roll crusher and screen, with a minimum of mess and no moisture pick-up, and hence, typically, without milling equipment.

ILLUSTRATIVE EMBODIMENTS

The following examples are intended to further illustrate the subject particle(s). These illustrative embodiments of the invention are not meant to limit the claims of this invention to the particular details of these examples. These examples can be based on engineering calculations and actual operating experience with similar processes.

Example 1

About 30 grams of paraffin wax is melted at about 60° C. in a flask equipped with a mixer, such as a mixer sold under the trade designation L4RT by Silverson Machines, Inc. of East Longmeadow, Mass. The temperature is increased until the viscosity is reduced enough to allow thorough mixing at about 100° C. While stirring, about 60 grams of the iron sulfate monohydrate is added. The iron sulfate monohydrate can have a bulk density of 1.9 g/cc and a crystal density of 3.0 g/cc with a voidage of about 36.7%. After mixing for 5 minutes, the samples are cooled while mixing until the samples begin to gel. The gel is removed, hand-extruded to form droplets of about 5,000 microns in size, and allowed to harden.

Example 2

About 30 grams of pitch is melted at about 225° C. in a flask equipped with a mixer, such as a mixer sold under the trade designation L4RT by Silverson Machines, Inc. of East Longmeadow, Mass. The pitch can be ash-free and produced by collecting and fractionating a heavy product of a slurry hydrocracker. The pitch may have a density of 1.185 g/cc. The temperature is increased until the viscosity is reduced enough to allow thorough mixing at about 300° C. A release of water vapor may occur due to the relatively high temperature. While stirring, about 60 grams of the iron sulfate monohydrate is added. The iron sulfate monohydrate can have a bulk density of 1.9 g/cc and a crystal density of 3.0 g/cc with a voidage of about 36.7%. The pitch can be in a volumetric amount equivalent to about 10% of the void volume of the iron sulfate monohydrate particles for the purpose of binding the mass and sealing the outside of the granules. After mixing for 5 minutes, the samples are cooled while mixing until the samples begin to gel. The gel is removed, hand-extruded to form droplets of about 5,000 microns in size, and allowed to harden.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for making a catalyst comprising a catalytically effective amount of one or more iron compounds for catalyzing one or more reactions in a hydrocarbon cracking system, comprising:

A) grinding particles comprising the catalyst so substantially all the particles have a maximum dimension no larger than about 130 microns, said particles having hydrophilic properties; and B) coating the particles with a hardened layer of effective amount of one or more hydrocarbons to reduce the hydrophilic properties of the particles.

2. The process according to claim 1, wherein the iron is at least partially comprised in at least one or more compounds of an iron oxide, an iron sulfate, and an iron carbonate.

3. The process according to claim 1, wherein the iron is comprised in an iron sulfate.

4. The process according to claim 1, wherein the iron is comprised in at least one of an iron sulfate monohydrate and an iron sulfate heptahydrate.

5. The process according to claim 1, wherein the one or more hydrocarbons is processable with a feed in the hydrocarbon cracking system.

6. The process according to claim 1, wherein the one or more hydrocarbons has a melting point temperature of no more than about 250° C.

7. The process according to claim 6, wherein the one or more hydrocarbons is processable with a feed for the hydrocarbon cracking system.

8. The process according to claim 7, wherein the hydrocarbon cracking system is a slurry reactor system.

9. The process according to claim 1, wherein the one or more hydrocarbons has a melting point temperature of no more than about 80° C.

10. The process according to claim 1, wherein the one or more hydrocarbons comprises at least one of a wax, a pitch, a deasphalted oil, a petroleum resin, and a low molecular weight polymer.

11. The process according to claim 1, wherein the coating has sufficient moisture resistance to prevent agglomeration of the catalyst.

12. The process according to claim 1, wherein the weight ratio of the ground particles to the one or more hydrocarbons is about 200:1 to about 1:1.

13. The process according to claim 1, wherein a hammermill or a ball mill grinds the particles.

14. The process according to claim 1, wherein the iron is at least partially comprised in at least one or more compounds of an iron oxide, an iron sulfate, and an iron carbonate.

15. The process according to claim 1, wherein the iron is comprised in at least one of an iron sulfate monohydrate and an iron sulfate heptahydrate.

16. The process according to claim 1, wherein the one or more hydrocarbons has a melting point temperature of no more than about 250° C.

17. The process according to claim 1, wherein the one or more hydrocarbons has a melting point temperature of no more than about 80° C.

18. A process for making a catalyst comprising a catalytically effective amount of one or more iron compounds for catalyzing one or more reactions in a hydrocarbon cracking system, comprising:

A) grinding particles comprising the catalyst so substantially all the particles have a maximum dimension no larger than about 130 microns; and B) coating the particles with a hardened layer of effective amount of one or more of a pitch, a deasphalted oil, a petroleum resin, and a low molecular weight polymer to reduce the hydrophilic properties of the particles.

* * * * *